May 7, 1940.　　　F. W. SEBREAN ET AL　　　2,199,861
ANTIFRICTION FISHING ROD TIP
Filed Oct. 7, 1938　　　2 Sheets-Sheet 1
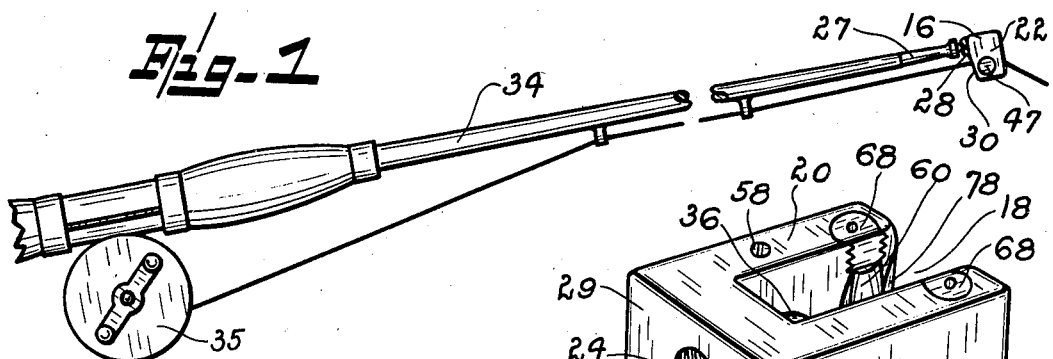
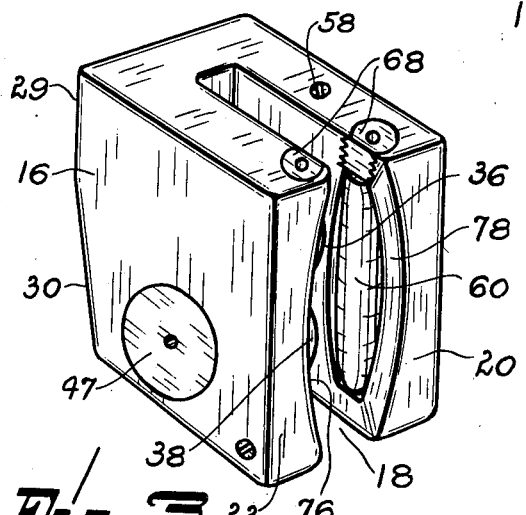
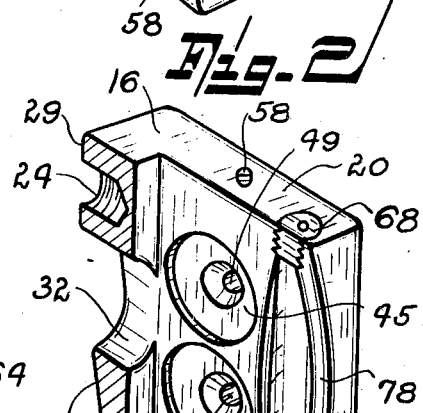
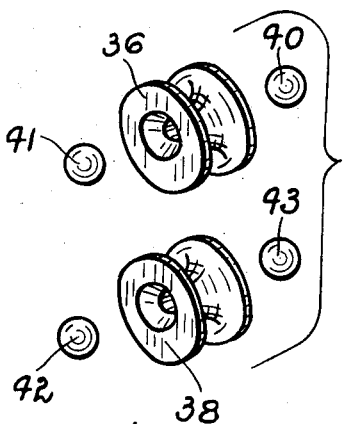
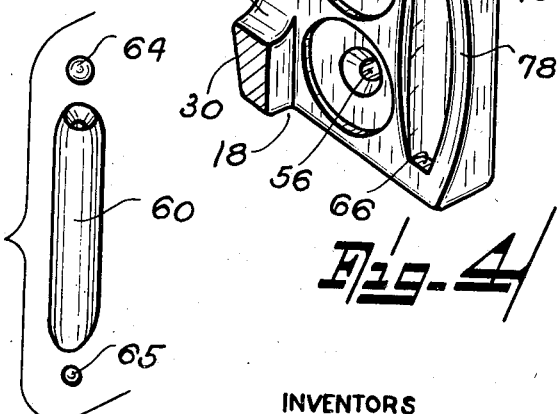
INVENTORS
FRANK W. SEBREAN
MATTHEW A. JARDINE
BY
Smith & Tuck
ATTORNEYS

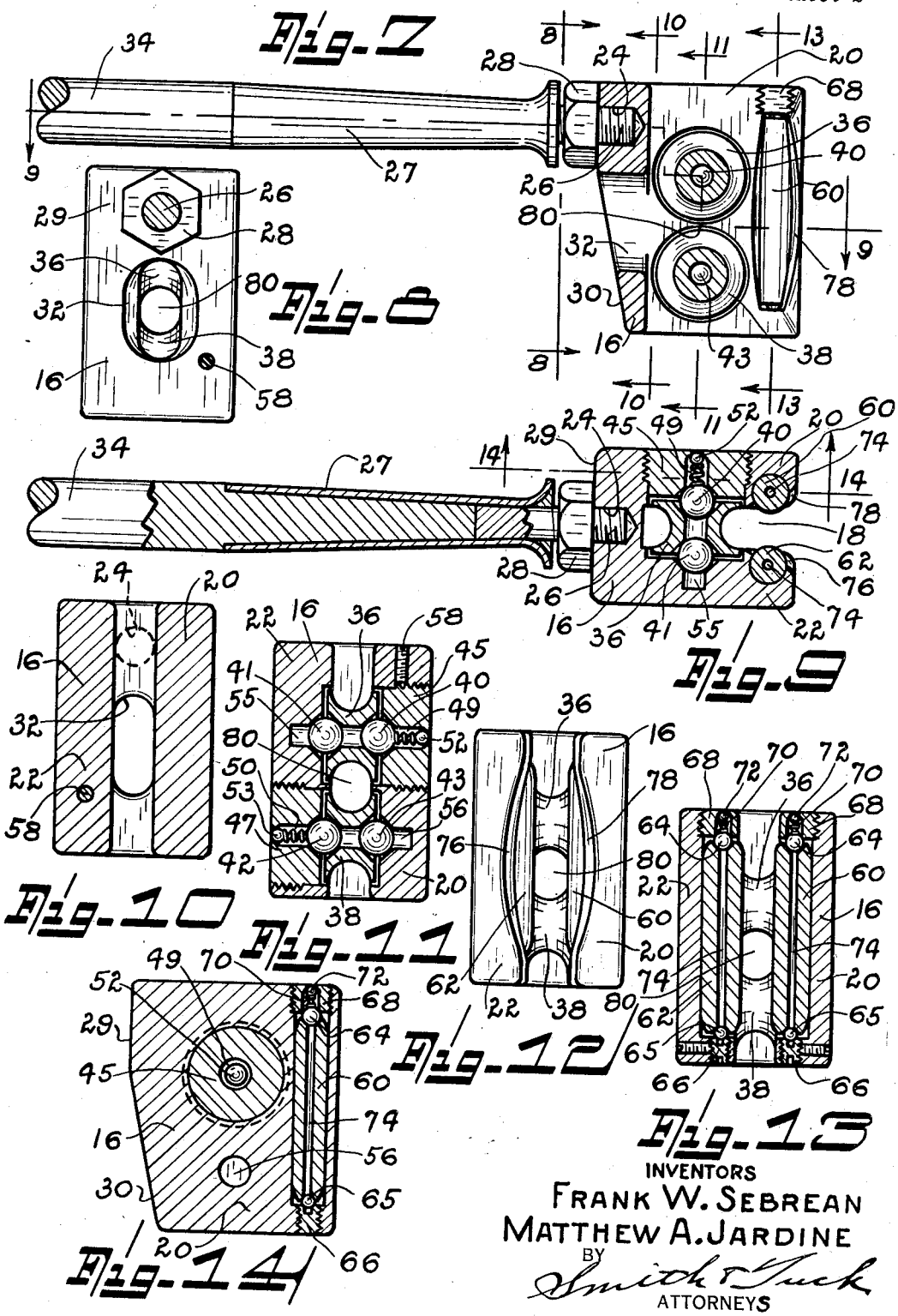

Patented May 7, 1940

2,199,861

UNITED STATES PATENT OFFICE 2,199,861

ANTIFRICTION FISHING ROD TIP

Frank W. Sebrean and Matthew A. Jardine, Seattle, Wash.

Application October 7, 1938, Serial No. 233,850

2 Claims. (Cl. 43—24)

Our present invention relates to the general art of fishing rod fittings and more particularly to an antifriction fishing rod tip.

In fishing for the larger types of fish it has been found that unusual strains are placed often upon the fishing rod tip. This is due to the fact that often very heavy sinkers are used or, when a heavy fish is hooked and is being played on the rod, a severe strain is placed on the tip and, unless it be arranged to provide maximum freedom from friction, there is a pronounced tendency to not only wear out the tip itself but to unnecessarily wear the line. This is especially true where an expensive fibre line is used, such as silk, or linen. Recent fishing, however, has developed the gradual adoption of wire for fishing lines. This is particularly true in trolling where it has been found that the reduced resistance of wire as it is drawn through the water permits fishing for a certain depth without a sinker or, if a sinker is used due to the reduced resistance of the line, much greater depth can be obtained at the same trolling speed. Wire, however, whether it be copper, stainless steel, Monel, or any of the various alloys used, has a very decided cutting action and tends to cut out steel or agate guides very quickly. It is particularly for the latter type of fishing line that we have created our present fishing rod tip which consists essentially of two end embedded, revolvable sheaves so disposed that they will take the strain in the two positions in which the rod is used, one with the reel below the rod and then with the reel above the rod. Further, to overcome friction and to assure that the line will run fairly through the sheaves provided and not cut the flanges thereof, we have provided additional guide rollers. Further, we have mounted all rollers and sheaves on ball bearings and have provided convenient means for lubricating them.

The principal object of our present invention is, therefore, to provide an antifriction tip which reduces the friction of the line in the tip guides thereby lengthening the life of both the line and the tip and at the same time, by reducing friction, making it simpler to pay out or take in the line.

A further object of our present invention is to provide guide means that will assure that the line run fairly through the sheaves provided in our tip.

Another important object of our present invention is to so construct our tip that it may be conveniently lubricated and will hold its lubrication so that with the minimum of attention the tip will stand hard usage for long periods.

Other and more specific objects will be apparent from the following description taken in connection with the accompanying drawings, wherein:

Figure 1 is a view showing parts of a conventional fishing rod and reel with our tip applied thereto.

Figure 2 is a perspective view of our fishing rod tip as viewed from the reel side of the tip.

Figure 3 is a perspective view of our tip as viewed from the side from which the fishing line is paid out.

Figure 4 is a perspective view showing one-half of our tip with the rollers and sheaves removed to more fully illustrate its construction.

Figure 5 is a perspective view, bracketed, showing one of the guide rollers used together with its ball bearing.

Figure 6 is a bracketed view showing the two line sheaves with their supporting ball bearings.

Figure 7 is a side elevation partly in section of a rod tip with our antifriction tip secured thereto.

Figure 8 is a cross-sectional view taken along the line 8—8 of Figure 7.

Figure 9 is a cross-sectional view taken along the line 9—9 of Figure 7.

Figures 10, 11, and 13 are sectional views taken along similarly numbered lines of Figure 7.

Figure 12 is a front elevation of our tip.

Figure 14 is a sectional view taken along line 14—14 of Figure 9.

Referring to the drawings, throughout which like reference characters indicate like parts, 16 designates the base or principal frame of our tip, which is made of non-rustable material as are the sheaves and guide rollers. This base is bifurcated at 18 to form the two parallel side plates 20 and 22. The closed end is provided with a threaded screw tip receiving bore 24 which is adapted to receive the threaded portion 26, formed as part of rod tip 27. When our tip is screwed in place it is secured there by the jam or lock nut 28 which is tightly seated against the squared end surface 29 so as to assure alinement with permanent guides on the rod.

For lightness we have elected to bevel the end portions extending downwardly from the squared portion 29 as 30 and to pierce this end with, preferably, an oval slot 32. This slot is to receive the line as it passes on down rod 34 to reel 35.

The inner surface of each side plate 20 and 22 is machined substantially after the showing of Figure 4 which is more fully illustrated in the sectional views 7, 9, 11, 13, and 14. Spaced between the two side plates are the line guiding sheaves 36 and 38. These are given a conical counterbore at each end so as to form a seat for the individual ball bearings 40, 41, 42, and 43, respectively. Each side frame is recessed after the showing of the various views so that they overlap the rim of the sheave and thus protect them against wear and further assure that the line or wire cannot run off the sheave and become locked behind the same.

The manner of mounting the sheaves 36 and 38 will probably be best understood from Figures 9 and 11. It will be noted that each of the ball bearings has a conical seat in the sheave and a similar seat either in the side plates directly or in the screwed in plug members 45 and 47. These plug members are both convenient and necessary; they provide for the easy machining of the sheave seat and ball bearing seats and also provide a convenient means of assembly and disassembly of the tip so that it may be easily taken apart if cleaning or replacement is required. In the screwed-in plugs we provide a bored out portion as at 49 and 50 in which is disposed a small coil spring which seats balls 52 and 53 so that they form a closure for the small hole which terminates bores 49 and 50. This provides a dirt and water tight closure for these chambers and permits the easy oiling of the same so that when these chambers, and the chambers at the opposite ends of the sheaves as 55 and 56, are filled with suitable lubricant the occasional resupply of, preferably, a lighter character, through these ball closed openings, will give adequate lubrication means for the sheaves. It is to be noted from Figure 11 particularly that the two sheaves coming very close together as they do form almost a circular guideway for the fishing line or wire. Any suitable means may be employed to secure plugs 45 and 47 against unscrewing, as, for instance, the set screws indicated at 58.

It has been found in service that with heavy poles there is often a tendency for the heavy sinkers or heavy fish to put a side draft on the line. This would tend to draw the line against the metal of the tip itself, or sufficiently against the flanges of the sheaves as to cause unnecessary friction and wear. To overcome this condition we have provided adjacent the edges of the sheaves as is probably best illustrated in Figures 7 and 9, two vertically disposed rollers as 60 and 62. These rollers are largely embedded in the guide plates 20 and 22 and are supported in the same manner as the sheaves by ball bearings at each end of the same as 64 and 65. The recesses for these guide rollers are usually formed before the slotting of the material at 18 and is accomplished by drilling through the material. The lower end of this opening is plugged at 66 and is machined to form a seat for ball 65. At its upper end the rollers are provided with ball bearings 64 which are again seated in plug members 68. These plug or bushing members are similar to the plugs or bushings supporting the sheaves and are counter-bored at 70 to form an oil receiving opening which is closed by the spring urged ball 72. With this construction it is believed apparent that ample means are provided for fully lubricating our tip. This is particularly true in view of the fact that the guide members are through drilled at 74 and the sheaves themselves are bored through their centers to permit the free flow of the lubricant from one ball bearing to the other and to assure that a single oiling port will be sufficient to oil both bearings.

It has been desirable to relieve the front face of plates 20 and 22 as at 76 and 78 so that the metal will be cut away sufficiently that any reasonable use of the pole will assure that the guide rollers will carry the line and prevent it from resting upon the solid metal of the tip where undue friction and cutting as well as damage to the line would ensue.

It has been found desirable to use the two sheaves with the central line receiving opening 80 to the end that when the pole is used with the reel lowermost the lower sheave as 38 takes the burden of the line; and when the pole is turned with the reel 35 uppermost the sheave 36 carries the line. As will be noted in Figure 11 a fin of metal actually separates the flanges of the two sheaves thus providing a full circle counterbore for each flange.

It is further believed to be apparent that by having the screw connection at 26 it is a simple matter to change one of our tips for another one of a different size which would possibly be better for changing conditions such as a heavier line, or changing from a fibre or silk line to a steel wire. Or, if desired, the user could have two or more rods with different sized tips on the rod and use the same tip assembly.

The foregoing description and the accompanying drawings are believed to clearly disclose a preferred embodiment of our invention but it will be understood that this disclosure is merely illustrative and that such changes in the invention may be made as are fairly within the scope and spirit of the following claims.

We claim:

1. The combination with a fishing rod tip comprising a bifurcated housing having spaced side walls and a rear wall having a line-aperture and uniting the side walls, of a pair of grooved sheaves journaled in the side walls in front of said aperture, said side walls in their inner faces each having a bearing socket, the inner, front edge of each wall being concave, and a roller journaled in each socket, and a substantial portion of each roller being available by means of said concavity, the axes of said rollers being in planes at right angles to the axes of the grooved sheaves.

2. The combination with a fishing rod tip comprising a bifurcated housing having spaced side walls and a rear wall having a line-aperture and uniting side walls, of a pair of said sheaves mounted in front of said aperture, said sheaves and side walls having complementary journal bearings and spherical journals in complementary bearings, said side walls in their inner faces each having a bearing socket, the inner, front edge of each wall being concave, and a roller journaled in each socket, and a substantial portion of each roller being available by means of said concavity, the axes of said rollers being in planes at right angles to the axes of the sheaves.

FRANK W. SEBREAN.
MATTHEW A. JARDINE.